(12) United States Patent
Walther et al.

(10) Patent No.: US 6,741,906 B2
(45) Date of Patent: May 25, 2004

(54) CONTROL UNIT FOR A MACHINE TOOL OR A COORDINATE MEASURING APPARATUS

(75) Inventors: Jörg Walther, Gerstetten (DE); Helmut Haug, Ostfildern (DE); Reinhold Widmaier, Aalen (DE); Gunnar Vogel, Kolbach (AT); Rainer Beerhalter, Stuttgart (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/222,877

(22) Filed: Aug. 19, 2002

(65) Prior Publication Data

US 2003/0040884 A1 Feb. 27, 2003

Related U.S. Application Data

(63) Continuation of application No. PCT/EP01/00851, filed on Jan. 26, 2001.

(30) Foreign Application Priority Data

Feb. 18, 2000 (DE) .......................................... 100 07 508
Mar. 3, 2000 (DE) .......................................... 100 10 128

(51) Int. Cl.⁷ ............................ G06F 19/00; G05B 15/00
(52) U.S. Cl. ........................ 700/180; 700/83; 700/159; 345/156; 710/1

(58) Field of Search ............................ 700/83, 90, 159, 700/180; 345/156; 710/1, 2

(56) References Cited

U.S. PATENT DOCUMENTS

| | | | |
|---|---|---|---|
| 5,808,434 A | | 9/1998 | Kokura et al. |
| 5,825,408 A | * | 10/1998 | Yuyama et al. ........... 348/14.01 |
| 6,094,204 A | * | 7/2000 | Takizawa ..................... 345/556 |
| 6,433,821 B1 | * | 8/2002 | Gouhara et al. ........ 348/231.99 |
| 6,519,052 B1 | * | 2/2003 | Oneda et al. .............. 358/1.16 |

FOREIGN PATENT DOCUMENTS

EP         0 851 401          7/1998

* cited by examiner

Primary Examiner—Jayprakash N. Gandhi
(74) Attorney, Agent, or Firm—Walter Ottesen

(57) ABSTRACT

A control unit for a machine tool or a coordinate measuring apparatus includes a control console having at least one operator-controlled element and a display screen. The operator-controlled element and the display screen are connected to a computer of the machine tool or the coordinate measuring apparatus. A converter expands or compresses a display screen signal outputted by the computer so that the entire content of the display screen on the control console is filled out with the display screen content of the computer independently of the image resolution of the display screen signal.

27 Claims, 5 Drawing Sheets

CONTROL UNIT FOR A MACHINE TOOL OR A COORDINATE MEASURING APPARATUS

RELATED APPLICATIONS

This application is a continuation application of international patent application PCT/EP01/00851, filed Jan. 26, 2001, and claiming priority from German patent application 100 07 508.8, filed Feb. 18, 2000 and German patent application 100 10 128.3, filed Mar. 3, 2000.

FIELD OF THE INVENTION

The invention relates to a control unit for a machine tool or a coordinate measuring apparatus wherein the control unit includes, as an essential component, a control console for the machine tool or the coordinate measuring apparatus.

BACKGROUND OF THE INVENTION

Control units having a control console have been known already for some time and function especially to permit the operator of the machine tool or coordinate measuring apparatus to read out important information remote from the measuring computer. This important information can, for example, be the position of the machining carriages in a machine tool or the position of the probe ball in a coordinate measuring apparatus. The control console has a LCD display for displaying the information which can be displayed selectively on the LCD display. In machine tools having electrical drives or in coordinate measuring apparatus having electrical drives, the control console further serves to permit the drives of the machine tool or of the coordinate measuring apparatus to be moved via corresponding operator-controlled elements, such as control levers. Also, other functions of the machine tool or of the coordinate measuring apparatus, such as the change of a machining work tool in a machine tool or the change of a probe pin in a coordinate measuring apparatus, can be triggered from the control console.

The control console can be connected to the control of the machine tool or of the coordinate measuring apparatus via a relatively long bus cable. For this reason, the control console can be placed very simply at different locations so that, especially for large coordinate measuring apparatus whose measuring table is often longer than 10 m, the operator can always be located in the vicinity of the workpiece to be measured in order to call up important information from this location or, if required, to control the functions of the coordinate measuring apparatus.

The function of the already known control consoles used to date is, however, very greatly limited because of the LCD display used which can only show alphanumerical information. It would be especially desirable if the operator of the coordinate measuring apparatus at the location of the apparatus not only had access to the control, but especially also had access to the computer of the machine tool or of the coordinate measuring apparatus.

SUMMARY OF THE INVENTION

It is an object of the invention to provide a universally useable control unit having a control console of the kind described above with which it is especially possible to operate the computer at a greater distance therefrom.

The control unit of the invention is for a machine tool or a coordinate measuring apparatus and includes: a control console having at least one operator-controlled element and a display screen; the operator-controlled element and the display screen being connected to a computer of the machine tool or the coordinate measuring apparatus; and, a converter for expanding or compressing a display screen signal outputted by the computer so that the entire content of the display screen on the control console is filled out with the display screen content of the computer independently of the image resolution of the display screen signal.

The coordinate measuring apparatus of the invention includes: a computer for evaluating measuring results; and, a control unit including: a control console placeable at different locations; the control console having at least one operator-controlled element and a display screen; the operator-controlled element and the display screen being connected to the computer; and, a converter for expanding or compressing a display screen signal outputted by the computer so that the entire content of the display screen on the control console is filled out with the display screen content of the computer independently of the image resolution of the display screen signal.

The basic idea of the invention is that, on the one hand, an operating console is provided with at least one operator-controlled element and a display, wherein the operator-controlled element and the display can be connected to a computer of a machine tool or a coordinate measuring apparatus. In addition, a converter is provided which expands or compresses the display signal of the computer in such a manner that the entire content of the display on the control console is filled with the display content of the computer independently of the image resolution of the display signal outputted by the computer.

Providing only a display on the control console, which is connected to the computer of the machine tool or of the coordinate measuring apparatus, is not sufficient to solve the task of the invention because the different machine tools or coordinate measuring apparatus have completely different computer types or software packages with completely different image resolutions.

A control unit of this kind exhibits the significant advantage that, on the one hand, a control unit is provided with which the computer of the machine tool or of the coordinate measuring apparatus can be operated remotely from the computer of the machine tool or the coordinate measuring apparatus and this control unit can additionally be utilized universally with a plurality of different computers.

As a display, basically any display is conceivable. Because of the fact that the control console often has to be displaced by the operator, no tube image display should, however, be used, rather, a very light TFT display should be used.

As a converter, a microcontroller can be used into which the particular resolution of the computer is inputted and which expands or compresses the display screen signal of the computer in correspondence to the inputted data so that the entire content of the display screen on the control console is filled with the display screen content of the computer.

However, it is especially advantageous to so configure the microcontroller that the microcontroller automatically analyzes the display screen signal outputted by the computer with respect to its horizontal and vertical resolution and, automatically, executes the expansion or compression in accordance with this analysis.

The converter can be an integral component of the control console or can be accommodated at the computer end.

As operator-controlled elements, at least a keypad and/or a mouse operator-controlled unit should be provided on the control console with the keypad and mouse operator-controlled unit being likewise connected to the computer so that the inputs at the particular operator-controlled element can be transmitted to the computer. Additionally, a speaker can be provided in the control console which likewise is connected to the computer and outputs the corresponding audio outputs of the computer.

The mouse operator-controlled unit can, for example, be a conventional computer mouse, a track ball or a mouse pad.

The operator-controlled elements and/or the display screen and/or the speaker can be connected to the computer via cables or can be connected contactlessly to the computer.

If the distance from the control console to the computer exceeds several meters when using cables having electrical lines, then line drivers should also be provided which amplify the display screen signal or the speaker signal of the computer and, furthermore, line drivers should also be provided, which amplify the inputs of the keypad or the mouse operator-controlled unit.

It is especially advantageous that a cable includes a lightwave conductor because, in this way, considerably higher quantities of data per unit of time can be transmitted without difficulty. Especially with a configuration of the cable of this kind, it is advantageously possible that, from at least two of the below-listed units, the data can be transmitted via a common line of the cable: the display screen 33; the keypad 23; the mouse operator-controlled unit 26; and, the speaker 31.

Of course, it is advantageous to transmit the data of all of the above units via a common line of the cable.

Furthermore, a transmitter module can be provided to which the above cable can be connected at the computer end and additional connections are provided for the keypad and/or the operator-controlled unit and/or a display screen and/or a speaker. In addition to the display screen, the keypad, the mouse operator-controlled unit and the speaker in the control console, the same units can be provided at the computer end so that the computer can be controlled from the control console as well as directly at the computer.

The control unit can be utilized in all possible types of machine tools (such as CNC milling machines or CNC lathe machines) as well as in different coordinate measuring apparatus, such as stand measuring apparatus, portal measuring apparatus or bridge measuring apparatus, which are either provided with drives or are manually operated.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
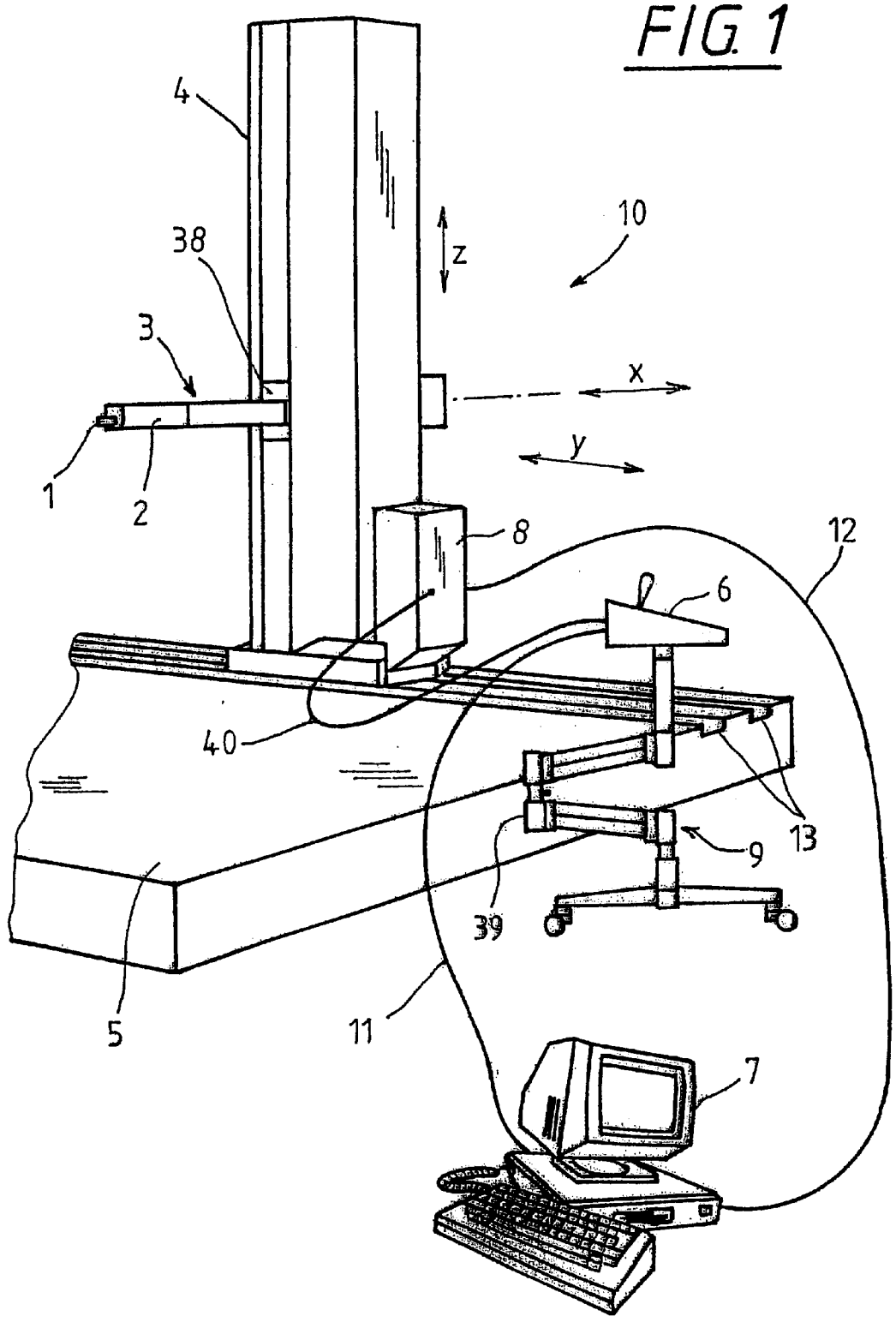
FIG. 1 is a perspective view of a coordinate measuring apparatus equipped with a control unit in accordance with the invention.

FIG. 1 shows a coordinate measuring apparatus 10 by way of example having a control unit 9 in accordance with the invention. The coordinate measuring apparatus of the invention includes a measuring table 5 having guides 13 on which a vertical stand 4 can be moved in the y-direction by means of drives (not shown).

A transverse slide 38 is movable on the stand 4 in the z-direction. The transverse slide 38, in turn, movably supports a horizontally directed measuring arm 3, which is movable in the x-direction. A probe head 2 is attached to the end of the measuring arm 3. The probe head detects the contact of a probe pin on a workpiece (not shown) to be measured. Scales are mounted in the x, y and z directions and have scale values which can be read out by optical probe heads. When there is contact of the probe pin 1 with a workpiece, the measurement values of the scales can be frozen as measurement values via the signal generated in the probe head 2. A control 8 controls the drives and reads out the corresponding measured values of the scales. The control is, on the one hand, connected via the cable 12 to a computer 7, wherein, inter alia, the measured values are evaluated. On the other hand, the control 8 is also connected to the control console 6 via the cable 40. The control console 6 is mounted on a movable support 39. Operator-controlled elements, such as control levers, are provided on the control console 6 via which the drives of the coordinate measuring apparatus 10 can be shifted. In addition, the control console 6 is connected also to the computer 7 via the cable 11 in accordance with the invention as will be explained hereinafter in connection with FIGS. 2 and 3.

Figure 2:
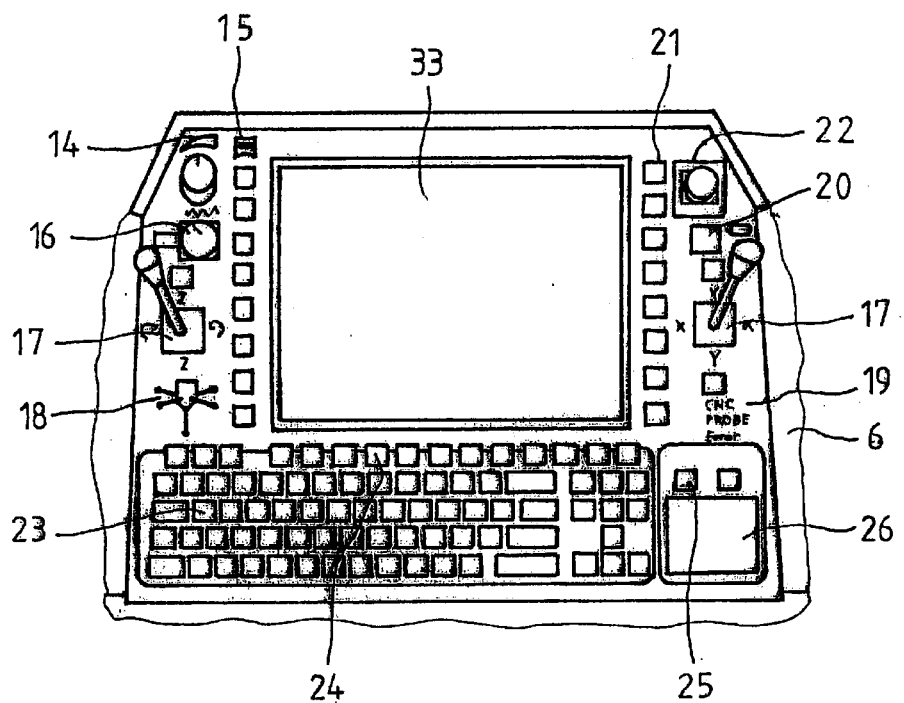
FIG. 2 is a plan view of a control console 6.

Before the function of the control console is explained in detail, the individual functions will be explained first with reference to FIG. 2, which shows a plan view of the control console according to the invention.

Reference numeral 14 identifies a potentiometer for speed control and reference numeral 15 identifies function keys which are provided, for example, for fixing axes, for reversing directions of travel, et cetera. Reference numeral 17 identifies two control levers with which the coordinate measuring apparatus of FIG. 1 can be moved in the coordinate directions x, y and z. The reference numerals (18, 19) identify LED displays which display different operating states of the coordinate measuring apparatus. Reference numeral 22 shows the emergency switchoff and reference numerals (23, 24) show the keys and function keys of a standard PC keypad. Reference numerals (25, 26) indicate a mouse operator-controlled unit having mouse keys assigned thereto. Reference numeral 33 identifies a TFT display screen.

Reference numerals 14 to 22 identify operator-controlled elements which are connected to the control 8 of the coordinate measuring apparatus; whereas, reference numerals 23 to 26 identify operator-controlled elements (that is, the keypad and the mouse operator-controlled units 25 and 26), which are connected to the computer 7 of the coordinate measuring apparatus 10. The display screen 33 is also connected to the computer 7 of the coordinate measuring apparatus.

Figure 3:
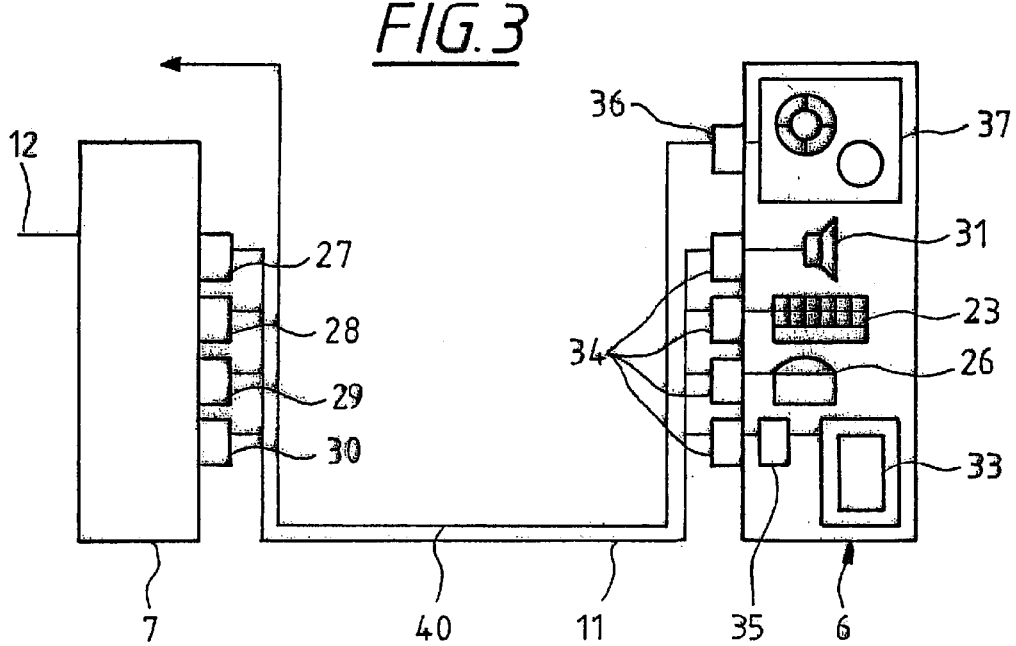
FIG. 3 is a schematic representation of the essential components of the control unit of the invention.

The control unit of the invention will be explained with respect to FIG. 3. FIG. 3 is a schematic representation wherein, inter alia, essential components of the control unit are shown.

As shown here, the control console 6 includes the mouse operator-controlled unit 26, the keypad 23, a speaker 31 and the display screen 33. These elements all coact with the computer 7. For this purpose, line drivers (27, 28, 29, 30) are connected to respective standard terminals of the computer.

The transmission will now be explained by way of example for the display screen 33. For this purpose, the line driver 30 is connected first to the standard terminal of the computer (that is, in this case, the contact strip of the graphics card to which the monitor is normally connected), which line driver, amplifies the display screen signal.

This amplified display screen signal is transmitted via the cable 11 to the input 34 at the control console 6, which then transmits the received display screen signal to the converter 35. The converter 35 is so configured that it automatically determines the image resolution of the computer 7 from the received display screen signal and so expands or compresses the display screen signal of the computer 7 that the entire content of the display screen 33 on the control console is filled with the display screen content of the computer 7 independently of the image resolution of the display screen signal outputted by the computer 7. In the same manner, the line driver 27 for the speaker 31 is inserted into the output receptacle of the sound card. The line driver 27 amplifies the signal of the sound card and transmits the signal via the cable 11 to the speaker 31. The line driver 28 is connected to the series interface for the keypad and receives the codes, which are outputted by the keypad 23 in the control console 6, and transmits these codes further to the corresponding interface. The line driver 29 is connected to the series interface to which usually the mouse is connected. This line driver too receives the pulses outputted by the mouse operator-controlled unit 26 in the control console 6 and conducts these to the computer 7.

In this way, it is possible in accordance with the invention to receive the entire display screen content of the computer 7 on the control console 6 remote from the computer 7 as well as to operate the computer via the keypad 23 and the mouse operator-controlled unit 26. The other operator-controlled units, such as the control levers 17, are conjointly identified by reference numeral 37 in FIG. 3. These other operator-controlled units drive the drives of the coordinate measuring apparatus 10 in a manner known per se and can trigger other functions such as the clamping of the probe pin, et cetera. These operator-controlled elements are connected via the cable 40 to the control 8 of the coordinate measuring apparatus. This connection is configured as a bus.

Figure 4:
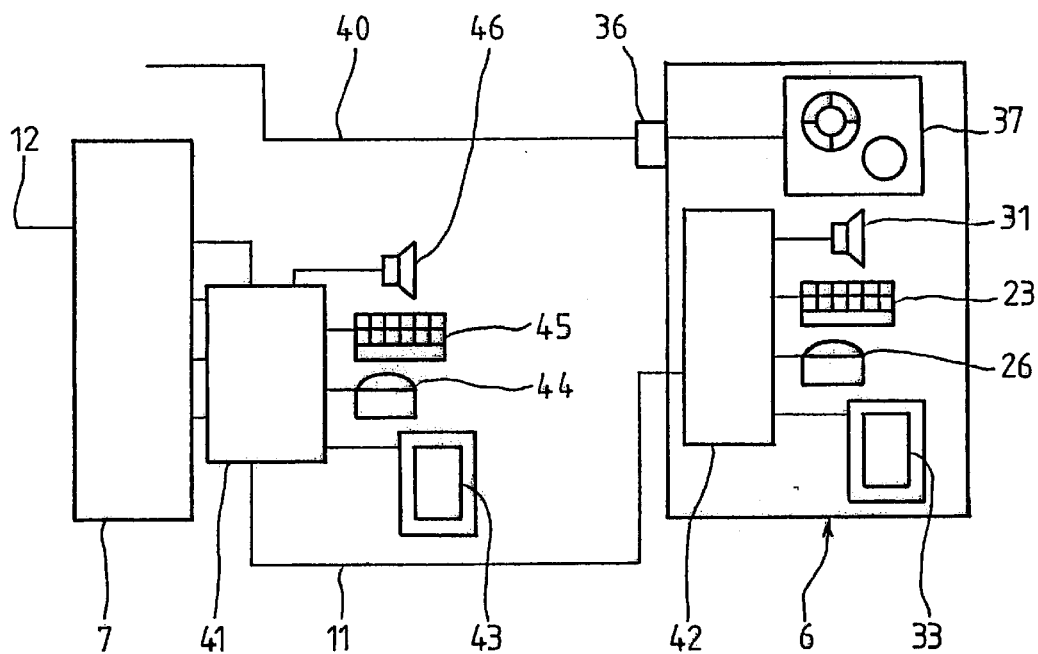
FIG. 4 is a schematic representation of the essential components of the control unit of the invention in accordance with a second embodiment.

FIG. 4 shows a second and especially advantageous embodiment of the control unit of the invention. Here, the signals between the computer 7 and the control console 6 are all transmitted via only a single line in the cable 11. The cable 11 includes a lightwave conductor in this embodiment so that the large data rates can be handled. For this purpose, a transmitter module 41 is connected directly to the above-described standard connections of the computer 7 for the display screen, the keypad, the mouse and the sound card. The transmitter module 41 converts the signals coming from the computer 7, such as the image screen signal, into a digital series data flow, which is transmitted to a receiver module 42 in the control console 6 via the cable 11, that is, the lightwave conductor and this data flow is here processed and transmitted to the operator-controlled elements, which are correspondingly connected, that is, to the speaker 31, the keypad 23, the mouse operator-controlled unit 26 and the display screen 33. In the same manner, the signals of the mouse operator-controlled unit 26 and the keypad 23 are converted in the receiver module 42 into a digital series data flow and transmitted via the cable 11 to the transmitter module 41 and processed by the transmitter module and transmitted further to the computer 7. The above-described converter 35 is, in this embodiment, disposed in the transmitter module 41. The converter 35 automatically determines the image resolution of the computer 7 from the received display screen signal and so expands or compresses the display screen signal of the computer 7 that the entire content of the display screen 33 on the control console is filled with the display screen content of the computer independently of the image resolution of the display screen signal outputted by the computer 7.

In addition, the transmitter module 41 has connections for an additional speaker 46, an additional keypad 45, an additional mouse operator-controlled unit 44 and a further display screen 43 so that all necessary components for the operation of the computer 7 are provided additionally also directly at the computer 7.

Figure 5:
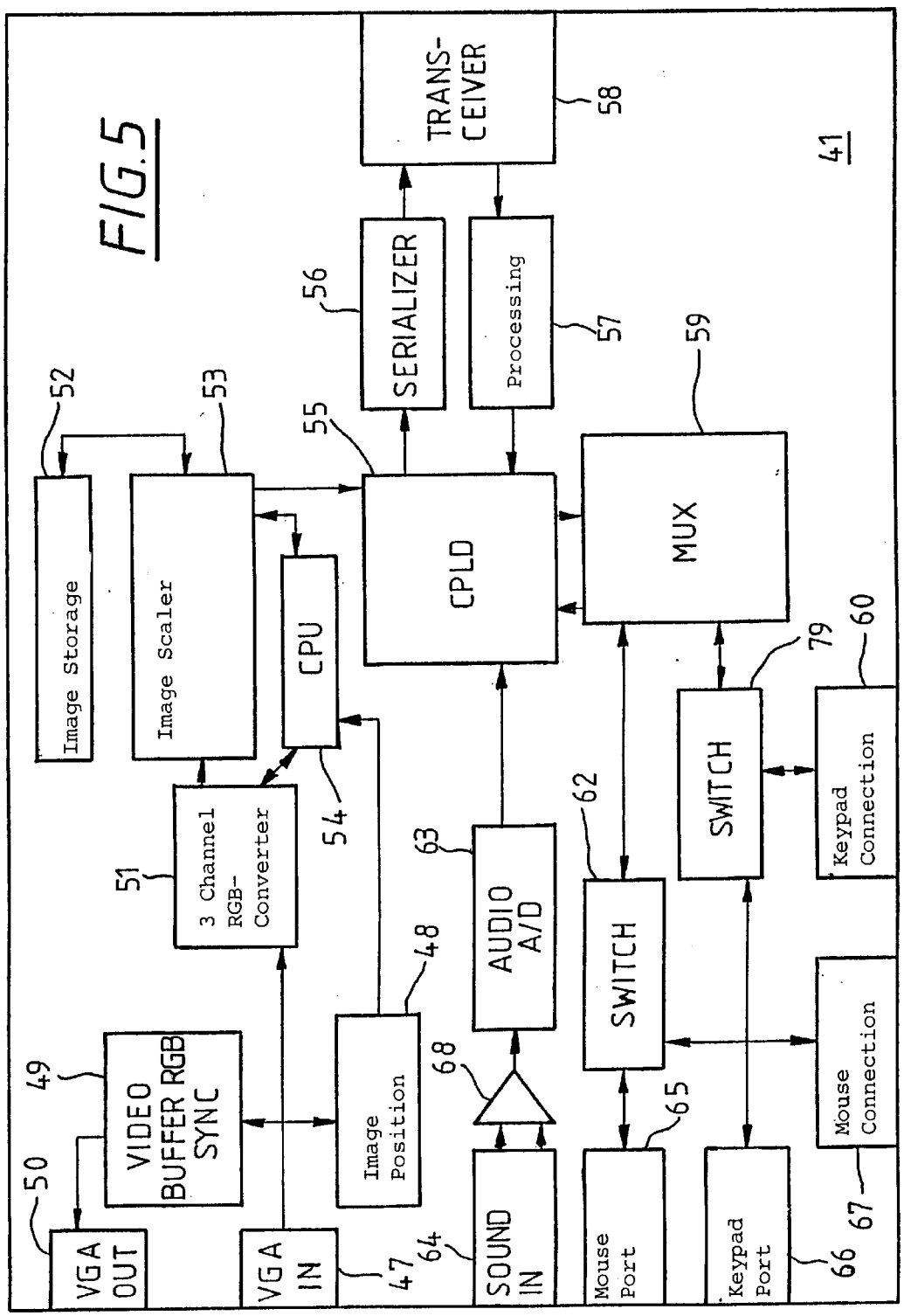
FIG. 5 is a schematic block diagram of a transmitter module 41.

The transmitter module 41 is explained in greater detail with respect to FIG. 5. First, the processing of the display screen signal is described. For this purpose, the display screen signal is tapped from the graphic card of the computer 7 and transmitted from the input 47, on the one hand, to the video buffer 49 which buffers the analog RGB input signals via a three-channel amplifier. The abbreviation RGB stands for red, green and blue. In the same manner, the synchronization signals are buffered, that is, the horizontal synchronization pulse, which hereinafter is identified as HSYNC, and the vertical synchronization pulse, which is identified hereinafter by VSYNC. The signals are then applied at the proper time to the output 50 and can be displayed by the display screen 43.

On the other hand, the display screen signal, which is tapped from the computer 7, is transmitted from the input 47 to a three-channel RGB converter 51. Here, a rapid analog-to-digital converter is provided which digitizes the analog RGB input signals on three channels, with each having eight bits. In this way, one channel is provided for each color. Furthermore, the display screen signal is also transmitted to the image position controller 48, which measures a series of parameters of the input timing. These parameters include the horizontal line duration, duration and polarity of HSYNC, point number of a line, phase position of image points to the scanning frequency, line numbers per image, start and end of the active image region as well as start and end lines of the active image region 30. The measured values are then transmitted to a CPU 54, which compares these values to plausible timings such as ESA standard timings and so derives parameter sets for the three-channel RGB converter 51, the image scaler 53, and the image memory 52. For the three-channel RBG converter 51, the image position controller 48 supplies the scanning frequency at which the analog RGB input signals are digitalized. The digitalized RGB input signals and the sychronization signals HSYNC and VSYNC are then transmitted to the image scaler 53.

The image scaler 53 thereupon executes the expansion and compression of the image screen signal. For this purpose, the active display screen content of the original data is converted into the target resolution via digital filters having programmable coefficients. The scaling can take place in the horizontal direction as well as in the vertical direction within wide limits with a scaling factor of 0.34 to 2.95. A scaling factor of less than 1 means a reduction in the corresponding axis and a scaling factor greater than 1 means an increase. The scaling is likewise controlled by the CPU 54. The CPU 54 scales in the horizontal direction as well as in the vertical direction so that the entire content of the display screen 33 on the control console is filled with the display screen content of the computer 7. The scaled result is then stored in the image memory 52.

The image scaler 53, the image memory 52, the three-channel RGB converter 51, the image position controller 48 and the CPU 54 assume here the task of the above-described converter 35, which automatically determines the image resolution of the computer 7 from the received display screen signal and so expands or compresses the display screen signal of the computer 7 that the entire content of the display screen 33 on the control console is filled out with the display screen content of the computer 7 independently of the image resolution of the display screen signal outputted by the computer 7.

The scaled image data as well as the synchronization signals VSYNC and HSYNC are transmitted to a CPLD component 55. This component is a programmable logical component. The logic component has, inter alia, the function of a multiplexer which sequentially feeds the following to the serial data transmission path via the lightwave conductor of the cable 11: the image data from the image scaler 53 as well as the sound data from the sound card as will be explained in detail hereinafter, the sound data from the sound card and the data of the keypad interface and the mouse interface. The multiplexer has a function of further transmitting data received from the lightwave conductor. Data, which should be sent to the control console 6, are transmitted to a serializer 56 for this purpose, which generates a multiple shift frequency of the input data frequency. Here, especially an integrated component of the type HDMP1024 of the Agilent Company is advantageous. This component generates a twenty-four multiple shift frequency of the input data frequency. The processed data are then transmitted by the serializer 56 to a fiberoptic transceiver 58 at the shift frequency and the transceiver then couples the data into the lightwave conductor.

Data, which are transmitted from the control console 6 are, in contrast, received by the fiberoptic transceiver 58 and are converted into digitally processable signals by the signal processor 57. These signals are then transmitted via the multiplex operation of the CPLD component 55 to the mouse interface of the computer 7 or the keypad interface of the computer 7 as will be explained hereinafter.

As explained above, the following also have to be sent via the lightwave conductor: the sound data of the sound card, the data of the mouse interface and the data of the keypad and they are applied to the CPLD component 55 for transmission via the lightwave conductor. For this purpose, the input 64 for the sound data is connected to the output of the sound card of the computer 7 and is applied to a summation amplifier 68 in the transmission module. The transmission amplifier processes both stereo inputs to a single monosignal. The monosignal is applied to an audio A/D-converter 63, which converts the analog audio signal into a digital signal. The digital audio signal is then transmitted further to the CPLD component for transmission to the control console 6.

In the same manner, the mouse port 65 is connected to the mouse interface of the computer 7 and the keypad port 66 is connected to the keypad interface of the computer 7. For the above-described transmission of data from the computer 7 to the mouse operator-controlled unit 26 and to the keypad 23 and for the receipt of data from the operator-controlled elements, a mouse and keypad multiplexer 59 is provided between the mouse port 65 and the CPLD component 55 as well as between the keypad 66 and the CPLD component 55. The mouse and keypad multiplexer 59 converts between the bidirectional point-to-point protocol of the mouse or the keypad and the unidirectional protocol of the data transmission via lightwave conductors. Furthermore, an automatic switch 62 is provided between mouse port 65 and the mouse and keypad multiplexer 59 and an automatic switch 79 is provided between the keypad port 66 and the multiplexer 59. The switch 62 switches between the receipt of data of the mouse operator-controlled unit 26 on the control console 6 and the receipt from the mouse 44 connected locally to the mouse connection 67. The switch 79 switches between the receipt of data of the keypad 23 on the control console 6 and the receipt from a keypad 45 connected to the keypad connection 60. The switchover takes place via the check of the user activity and, for a determined user activity, the respective other operator-controlled element is locked for a defined time span.

Figure 6:
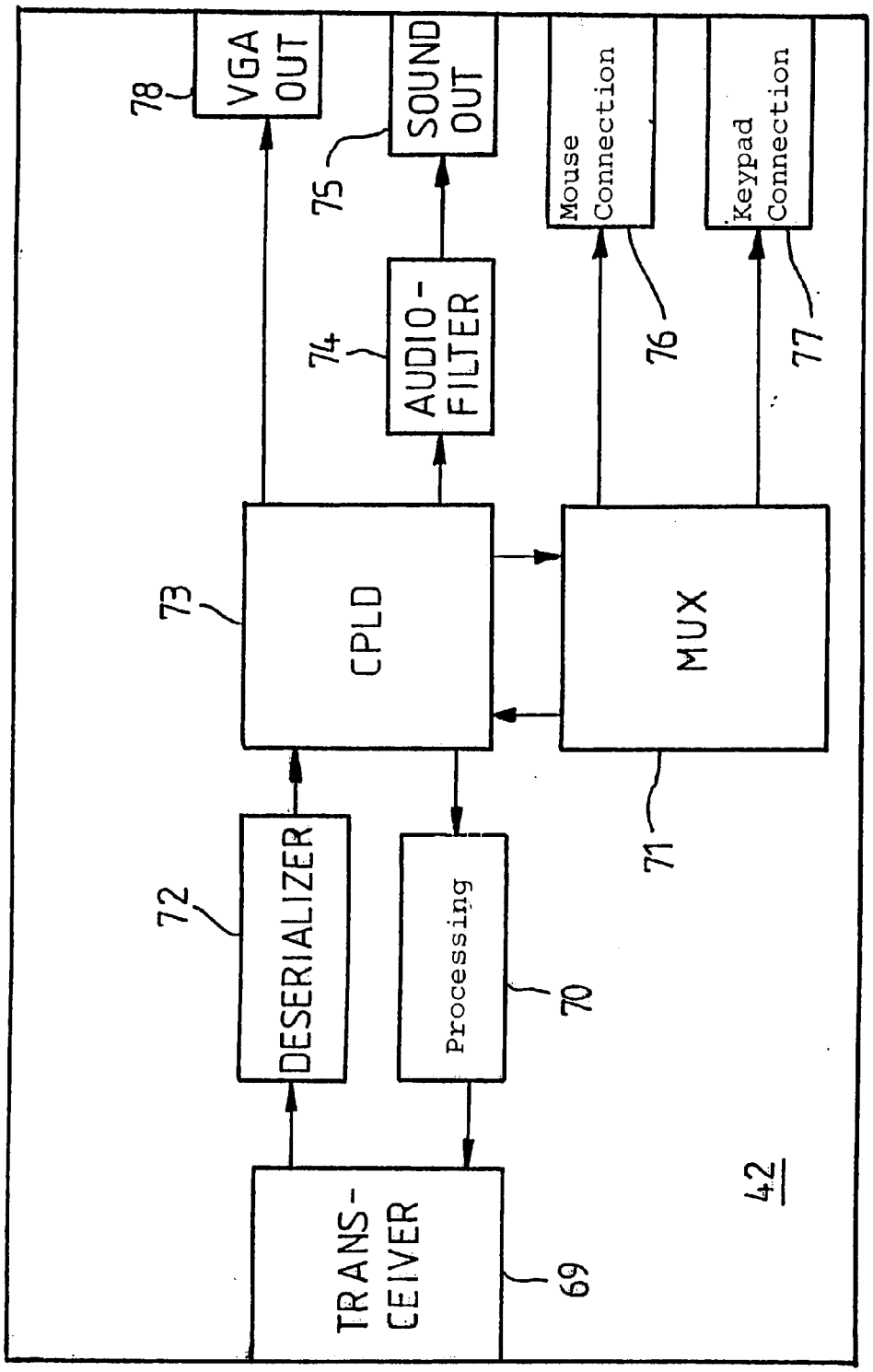
FIG. 6 is a schematic representation of a receiver module 42.

The receiving module 42, which operates together with the transmission module 41, will now be explained with respect to FIG. 6. The receiver module 42 has a fiberoptic transceiver 69 for communications as does the transmission module 41. The transceiver 69 is connected to the other end of the lightwave conductor. The received data are converted back into the original data and control signals via the deserializer 72 and are transmitted further to a CPLD component 73. The CPLD component separates the data again into individual data flows based on the signals of the deserializer 72 and conducts these further. Signals for the keypad 23 and the mouse operator-controlled unit 26 are again transmitted to a mouse and keypad multiplexer 71 which again provides a bidirectional point-to-point protocol from the unidirectional protocol and transmits the data via the mouse terminal 76 and the keypad terminal 77 to the mouse operator-controlled unit 26 and the keypad 23. The transmitted sound data are first again converted into an analog signal via a digital-to-analog converter disposed in the CPLD component and are then transferred to an audio filter 74 which filters out high frequency components which arise in the conversion before the sound signal is transmitted via output 75 to the speaker 31. From the data flow received by the deserializer 72, the image signal with all image data and display control signals is produced again and transferred via output 78 to the display screen 33, in this case, a TFT display. So that the TFT display can be driven, the image contents, which are derived from the data flow first have to be stored in a register bank, which demultiplexes the image data alternately into a digital "EVEN" data flow and an "ODD" data flow and thereafter, the register bank synchronizes the data flow. The signals HSYNC and VSYNC as well as "display enable" can be taken directly from the data flow.

Signals, which come from the mouse operator-controlled unit 26 and from the keypad 23, are converted in the reverse sequence from the bidirectional point-to-point protocol into a unidirectional protocol for the lightwave conductor transmission via the mouse and keypad multiplexer and are then transferred via the CPLD component 73 to a processor 70, which transfers the data into a data flow which can be transmitted by the transceiver 69.

The terminals 75 to 80 are realized in the form of a contact strip so that the receiver module can be attached variably to different operating consoles.

It is understood that the invention can be varied in many ways. For example, it is possible to provide reading apparatus for data carriers such as a floppy drive or CD-ROM drive via which the data can be read in from the remote computer 7.

It is understood that the foregoing description is that of the preferred embodiments of the invention and that various changes and modifications may be made thereto without departing from the spirit and scope of the invention as defined in the appended claims.

What is claimed is:

1. A control unit for a machine tool or a coordinate measuring apparatus, the control unit comprising:

a control console having at least one operator-controlled element and a display screen;

said operator-controlled element and said display screen being connected to a computer of said machine tool or said coordinate measuring apparatus and said computer functioning to output a signal of said display screen; and, a converter for expanding or compressing said display screen signal outputted by said computer so that the entire content of said display screen on said control console is filled out with the display screen content of said computer independently of the image resolution of said display screen signal.

2. The control unit of claim 1, wherein said converter functions to automatically determine the image resolution from said display screen signal of said computer and adapts correspondingly to said display screen of said control console.

3. The control unit of claim 1, wherein said control console includes, as operator-controlled elements, at least one of a keypad and a mouse operator-controlled unit which are likewise connected to said computer so that the input of said Operator-controlled elements can be transmitted to said computer.

4. The control unit of claim 3, wherein said control console includes a speaker which is connected to said computer and outputs the sound output of said computer.

5. The control unit of claim 4, wherein at least one of the following is connected at said computer with standard connections: said display screen, said Operator-controlled elements and said speaker.

6. The control unit of claim 5, further comprising line drivers for amplifying the signal of at least one of said display screen signal and the speaker signal of said computer.

7. The control unit of claim 5, further comprising line drivers for amplifying at least one of: the signal of said keypad and the signal of said mouse operator-controlled element.

8. The control unit of claim 3, wherein at least one of the following is connected to said computer contactlessly or via a cable: said operator-controlled elements and said display screen.

9. The control unit of claim 8, wherein said cable includes at least one lightwave conductor.

10. The control unit of claim 8, wherein said control unit is so configured that the data of at least two of the following are transmitted over a common line of said cable: said display screen, said keypad, said mouse operator-controlled unit and said speaker.

11. The control unit of claim 8, further comprising a transmitter module to which said cable is connected on the computer side and on which connections are provided for at least one of the following: said keypad, said mouse operator-controlled elements and said display screen.

12. The control unit of claim 1, wherein said converter is mounted in said control console.

13. The control unit of claim 1, wherein at least one reader is provided on said control console for a data carrier which reader can be connected to said computer and via which reader said computer can read in data from a data carrier.

14. A coordinate measuring apparatus comprising:
   a computer for evaluating measuring results; and,
   a control unit including:
      a control console placeable at different locations;
      said control console having at least one operator-controlled element and a display screen;
      said operator-controlled element and said display screen being connected to said computer and said computer functioning to output a signal of said display screen; and,
      a converter for expanding or compressing said display screen signal outputted by said computer so that the entire content of said display screen on said control console is filled out with the display screen content of said computer independently of the image resolution of said display screen signal.

15. The coordinate measuring apparatus of claim 14, wherein said converter functions to automatically determine the image resolution from said display screen signal of said computer and adapts correspondingly to said display screen of said control console.

16. The coordinate measuring apparatus of claim 14, wherein said control console includes, as operator-controlled elements, at least one of a keypad and a mouse operator-controlled unit which are likewise connected to said computer so that the input of said operator-controlled elements can be transmitted to said computer.

17. The coordinate measuring apparatus of claim 16, wherein said control console includes a speaker which is connected to said computer and outputs the sound output of said computer.

18. The coordinate measuring apparatus of claim 17, wherein at least one of the following is connected at said computer with standard connections: said display screen, said operator-controlled elements and said speaker.

19. The coordinate measuring apparatus of claim 18, further comprising line drivers for amplifying the signal of at least one of said display screen signal and the speaker signal of said computer.

20. The coordinate measuring apparatus of claim 18, further comprising line drivers for amplifying at least one of:
   the signal of said keypad and the signal of said mouse operator-controlled element.

21. The coordinate measuring apparatus of claim 20, further comprising drives and said control console including additional operator-controlled elements thereon which are connected to the control of measuring apparatus and the control of said drives.

22. The coordinate measuring apparatus of claim 16, wherein at least one of the following is connected to said computer contactlessly or via a cable: said operator-controlled elements and said display screen.

23. The coordinate measuring apparatus of claim 22, wherein said cable includes at least one lightwave conductor.

24. The coordinate measuring apparatus of claim 22, wherein said control unit is so configured that the data of at least two of the following are transmitted over a common line of said cable: said display screen, said keypad, said mouse operator-controlled unit and said speaker.

25. The coordinate measuring apparatus of claim 24, further comprising a transmitter module to which said cable is connected on the computer side and on which connections are provided for at least one of the following: said keypad, said mouse operator-controlled element, said display screen and said speaker.

26. The coordinate measuring apparatus of claim 15, wherein said converter is mounted in said control console or said converter is mounted in said transmitter console.

27. The coordinate measuring apparatus of claim 15, wherein at least one reader is provided on said control console for a data carrier which reader can be connected to said computer and via which reader said computer can read in data from a data carrier.

* * * * *

UNITED STATES PATENT AND TRADEMARK OFFICE
CERTIFICATE OF CORRECTION

PATENT NO. : 6,741,906 B2
DATED : May 25, 2004
INVENTOR(S) : Joerg Walther et al.

It is certified that error appears in the above-identified patent and that said Letters Patent is hereby corrected as shown below:

Column 8,
Line 53, delete "of" and substitute -- to -- therefor.

Column 9,
Lines 3 and 10, delete "Operator-controlled" and substitute -- operator-controlled -- therefor.
Line 48, delete "of" and substitute -- to -- therefor.

Signed and Sealed this

Seventeenth Day of August, 2004

JON W. DUDAS
*Acting Director of the United States Patent and Trademark Office*